(12) United States Patent
Dow et al.

(10) Patent No.: US 7,046,841 B1
(45) Date of Patent: May 16, 2006

(54) METHOD AND SYSTEM FOR DIRECT CLASSIFICATION FROM THREE DIMENSIONAL DIGITAL IMAGING

(75) Inventors: James W. Dow, Pelham, AL (US); Thomas Corbitt, Cambridge, MA (US); Robert A. McLaughlin, Oxford (GB)

(73) Assignee: Aerotec, LLC, Bessemer, AL (US)

( * ) Notice: Subject to any disclaimer, the term of this patent is extended or adjusted under 35 U.S.C. 154(b) by 64 days.

(21) Appl. No.: 10/651,666

(22) Filed: Aug. 29, 2003

(51) Int. Cl.
*G06K 9/00* (2006.01)

(52) U.S. Cl. .......................... 382/154; 345/419; 356/12

(58) Field of Classification Search ................ 382/154, 382/181, 195, 201, 204, 206, 224; 345/419, 345/420, 421, 427; 356/12, 5.01; 701/1, 701/4; 342/25
See application file for complete search history.

(56) References Cited

U.S. PATENT DOCUMENTS

| | | | | |
|---|---|---|---|---|
| 6,664,529 | B1* | 12/2003 | Pack et al. ................ | 250/208.1 |
| 2002/0060784 | A1* | 5/2002 | Pack et al. ...................... | 356/6 |
| 2004/0041805 | A1* | 3/2004 | Hayano et al. ............. | 345/419 |
| 2004/0058643 | A1* | 3/2004 | Martin et al. .............. | 455/3.02 |

OTHER PUBLICATIONS

R McLaughlin et al., "The Hough transform versus the upwrite", IEEE Transactions on Pattern Analysis and Machine Intelligence, vol. 20, No. 4, pp. 396-400, 1998.*
R McLaughlin et al., "The Hough transform and the upwrite: a comparison", in Proceedings IEEE International Conference on Neural Networks, Perth, western Australia, vol. 1, pp. 146-151, 1995.*
R McLaughlin et al., "Recognising aircraft:Automatic extraction of structure by layers of quadratic neural nets", in Proceedings IEEE International Conference on Neural Networks, Orlando, Florida,vol. 7, pp. 4288-4293, 1994.*
R McLaughlin et al., "Recognising of Infra Red Images of aircraft:rotated in Three Dimensions", in Proceedings IEEE ANZIIS, Perth, Western Australia, pp. 82-87, 1993.*
Yuh-Tay Liow, "A two-step approach to detect contours formed by sharp intensity changes", in Proceedings of the IECON-93—19th Annual Conference of IEEE Industrial Electronics, New York, NY, U.S.A., vol. 3, pp. 1616-1619, 1993.*
Randal C. Nelson, "Finding line segments by stick growing", IEEE Transactions on Pattern Analysis and Machine Intelligence, vol. 6, No. 5, pp. 519-523, 1994.*
McLaughlin, Robert, Intelligent Algorithms For Finding Curves And Surfaces In Real World Data, 2000, pp. 1-176.

* cited by examiner

*Primary Examiner*—Samir Ahmed
(74) *Attorney, Agent, or Firm*—Mayer, Brown, Rowe & Maw, LLP

(57) ABSTRACT

An automated system and/or method is disclosed for rapidly, accurately, and efficiently processing bulk three-dimensional digital image data of both path/corridor and area scenes to discriminate different structures or classifications of objects from within the image. The method first decomposes the three-dimensional digital imagery coordinate points into simple local structures and then extracts the globally complex structures from the local structures. The system and/or method incorporates procedures for sub-dividing the three-dimensional image data into rectilinear and/or ellipsoidal finite element cells, mathematically analyzing the contents (point coordinates) of each individual cell to classify/define the local structure, and extracting the globally complex structure or object from the image. The system and/or method applies accepted mathematical formulas to filter or classify large volumes of apparently random three-dimensional point coordinate spatial data into simpler structures and then to extract more globally complex objects generally encountered within the real world imagery scene being investigated.

27 Claims, 7 Drawing Sheets

METHOD AND SYSTEM FOR DIRECT CLASSIFICATION FROM THREE DIMENSIONAL DIGITAL IMAGING

FIELD OF INVENTION

The present invention relates generally to the field of extracting objects from three dimensional digital images. More specifically, the present invention is directed to improved filtering of digital data in the form of apparently random 3D coordinate points to discern discrete classes of objects and to define individual objects themselves.

BACKGROUND OF INVENTION

Aerial photography, light detection and ranging ("LIDAR"), synthetic aperture radar, and other types of remote sensing technologies are capable of capturing digital imagery for the purpose of extracting three-dimensional point coordinate data. These technologies are widely used in industry as vital tools to collect the data necessary for map-making, engineering, land management, and/or asset management. These tools are valuable because they can capture spatial (point coordinate) data in a digital format that ultimately allows a wide variety of computer-based tools to be applied to the tasks of map making, 3D modeling for engineering analysis, and/or land/asset management. Today, however, considerable time and effort (manual human intervention) is required to interpret the resulting imagery and extract information suitable (e.g., in a more meaningful object-oriented form) for input to existing computer-based tools for map-making, 3D modeling for engineering analysis, land management, and/or asset management. In order to input data directly from captured digital imagery into existing computer tools, the image must be interpreted and the objects included in the imagery must be extracted in an automated fashion (e.g. objects must be recognized and geometrically defined). Thus, systems and methods are continuously sought to improve the efficiency and accuracy of the image interpretation, object extraction, and data preparation processes related to map-making, engineering modeling, land management, and/or asset management tasks.

Three dimensional point coordinate data (3D imagery of a real-world scene) is practically useless unless individual points in space can be associated with recognizable objects within the scene, the physical and geometrical characteristics of the objects can be modeled, and the spatial relationships between the objects can be determined. The immediate need is to recognize objects within the scene. Next, the attributes (e.g., dimensions and physical characteristics) of the recognized object must be modeled. Finally, the objects must be analyzed to determine their relative spatial relationships. There are many tools available to model and analyze objects after they have been recognized and after their geometric and physical attributes have been determined. However, at the present time, there are only a few rudimentary approaches (usually based on simple data averaging or smoothing techniques or crude heuristic rules) for "filtering" or classifying three-dimensional point data to determine which subset of the points might be associated with a particular type of only a very few recognizable objects.

One approach is to have photogrammetrists construct stereo-models from pairs of stereo photographs, either traditional film or scanned digital images. Photogrammetrists then use their experience to interpret the images and manually digitize the geometric characteristics of the objects they are able to recognize. Another approach is to have photogrammetrists and/or scientists construct models by georeferencing LIDAR and/or synthetic aperture radar 3D point data to digital aerial photography or satellite imagery. They then use their experience to interpret the images. They either manually digitize the geometric characteristics of the objects they are able to recognize or use semi-automated computer tools to select individual 3D coordinate points that represent the objects that were recognized. Also, drafters and/or engineers may construct various 2D projections of 3D digital imagery data using CAD (Computer-Aided Drafting) systems and attempt to visualize the data. They manually select or discard points in order to construct a model from the imagery. Technicians may color code strata within the digital imagery by assigning different colors to designate elevation bands in hopes that topographic features can be recognized and their geometric characteristics can be digitized. Such visualization techniques may not be able to produce repeatable results.

Alternatively, mathematicians and programmers may use moving averages of point elevations (considered along scanlines) and other basic mathematical techniques or heuristic rules to analyze 3D point data and attempt to classify points that belong to the ground surface or other fundamental features or classes of objects within the imagery data.

Each example of these solutions above is directed toward the tasks involved with defining the "bare-earth" or "ground" surface and then discerning other recognizable objects within the field of the image so that the objects' geometric and other physical attributes can be digitized and the spatial relationships between objects can be modeled for subsequent analysis (e.g., map-making, engineering, land management, and/or asset management).

However, all of the above methods have major shortcomings. First, such methods produce inadequate and inaccurate results, especially when considering relatively sparse point data density. In addition, such methods are lengthy, time-consuming manual and/or semi-automated procedures. Since such procedures require a preservation of the original step-by-step process and intermediate results, only incremental improvements in operator productivity and product throughput can be achieved even with increases in operator experience. Moreover, such procedures often require specialized computing hardware and/or software. Also, such procedures produce results that either cannot be repeated or in most cases cannot be repeated with any degree of confidence. Often this is due to a requirement for significant experience or training of the human operator to interpret the intermediate results before the final result can be obtained, or it is due to a requirement for rigorous endurance on the part of a human operator in a tedious work environment. Such difficulties are compounded by the need for the production of multiple intermediate products before the final results can be achieved.

Thus, there is a need for a system to automate the rapid and accurate production of topographic/terrestrial features and/or surface models (whether of paths/corridors or areas) from large volumes of apparently random three-dimensional digital imagery coordinate point data acquired from synthetic aperture radar, LIDAR, acoustic and/or other similar technologies. There is a further need for a system which can break down the digital imagery (e.g., the three-dimensional coordinate point set) into relatively simple local structures that can be recognized based on mathematical characteristics derived from the relative spatial relationships between the individual points in the image and then extract or compose globally complex structures as assembled from collections of like/similar local structures.

SUMMARY OF THE INVENTION

These needs and others may be met by the present invention having an aspect which is a method for processing digital image data taken from a three-dimensional topographic scene including terrain to extract discrete objects. Waypoints are located to define a centerline and a bounded area to be analyzed. The primary dimensional characteristics or attributes of the objects to be extracted from the image are defined. Finite element cells are defined having a width dependent on the area of interest, a length dependent on the dimension of the objects and terrain variation and a height dependent on the discrete objects. The finite element cells are mapped to a normalized coordinate base. The digital image data is grouped, in the form of scanned three-dimensional point (x, y, z) coordinate points in Cartesian coordinate reference frames, into the finite element cells by determining eigenvalues and eigenvectors associated with each cell. Each of the three-dimensional points is classified as simple local structures. Globally complex structures are composed from the local structures.

A further aspect is a system for processing a three-dimensional digital image of topographic scenes to extract discrete objects. A processor accepts inputs of a three-dimensional digital image. The processor locates waypoints to define the primary dimensional characteristics or attributes of the objects to be extracted from the image. The processor defines finite element cells having a width dependent on the area of interest, a length dependent on the dimensions of the discrete objects and terrain variation and a height dependent on the discrete objects. The processor groups the digital image data, in the form of scanned three-dimensional point (x, y, z) coordinates in Cartesian coordinate reference frames, into the finite element cells. The processor classifies each of the three-dimensional points as simple local structures. The processor composes globally complex structures from the local structures.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

These and further aspects and advantages of the invention will be discussed more in detail hereinafter with reference to the disclosure of preferred embodiments, and in particular with reference to the appended Figures wherein.

DESCRIPTION OF THE PREFERRED EMBODIMENT

Figure 1:
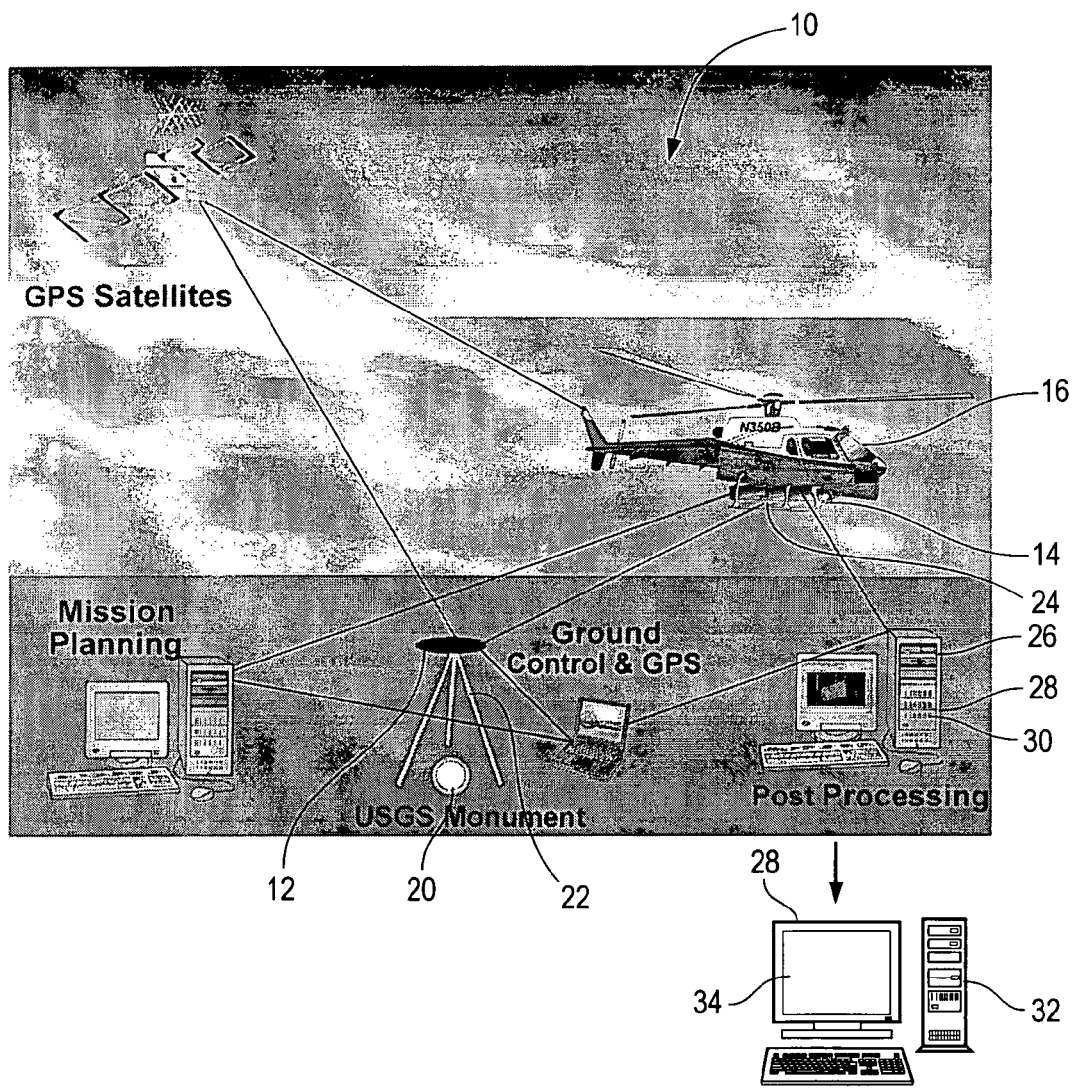
FIG. 1 is a block diagram of the hardware components used by an example of a remote sensing system used to collect 3D point coordinates for analysis according to one example of the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIG. 1 shows an example of a data capturing system which is a typical commercial LIDAR system 10 that captures digital image data in the form of apparently random three-dimensional point (x, y, z) coordinates (in any of several Cartesian coordinate reference frames) associated with a particular geographic path/corridor or area 12 along waypoints that define the path/corridor and/or the bounded area to be scanned to detect the presence of natural objects such as the ground surface, vegetation and man-made objects such as electric power transmission towers and/or conductors. The system 10 is an airborne remote sensing system that measures and positions the individual point coordinates in space to define the primary dimensional characteristics of the objects within the area 12 to be detected, classified, and/or extracted. As will be explained below given the detection of objects in a 3D space or topographic scene, classification and extraction of objects in the area 12 is performed using the method of the present invention.

The 3D digital image data may be collected by aerial digital LIDAR (Light Imaging Distance And Ranging) technology such as a scanning LIDAR instrument 14 mounted in an aerial platform 16 such as a helicopter. Of course other means of remote sensing such as synthetic aperture radar, many types of LIDAR, traditional 3D-digitizers, traditional aerial photography digitizing instruments, computer-based aerial photography digitizing techniques, etc. may be used to produce such 3D digital image data. The image to be analyzed is unique in that it is made up of dense (many) apparently random three-dimensional coordinate points in space.

A global positioning satellite (GPS) system 18 provides GPS coordinate data signals. The signals from the GPS satellite system 18 are recorded simultaneously by a ground reference GPS receiver station 20 which is located at a known survey monument location 22 and by a GPS receiver 24 mounted on the aerial platform 16. The GPS data is used for dual frequency post-processing to correct for measurement errors resulting primarily from the motion of the aerial platform 16.

The digital image data from the LIDAR instrument 14 is input to a computer 26 that includes a software system 30 to store and collect the 3D digital image data in relation to the area 12. The software system 30 may of course be provided for any of several different types of computer platforms. Once the data for an area of interest such as area 12 is collected, it is sent to a filtering system 28 for digital filtering allowing the composition of global structures according to the present invention. The filtering system 28 has a processor 32 which performs the procedures explained below. A display 34 is provided for display of objects filtered from the 3D digital image data.

Figure 2:
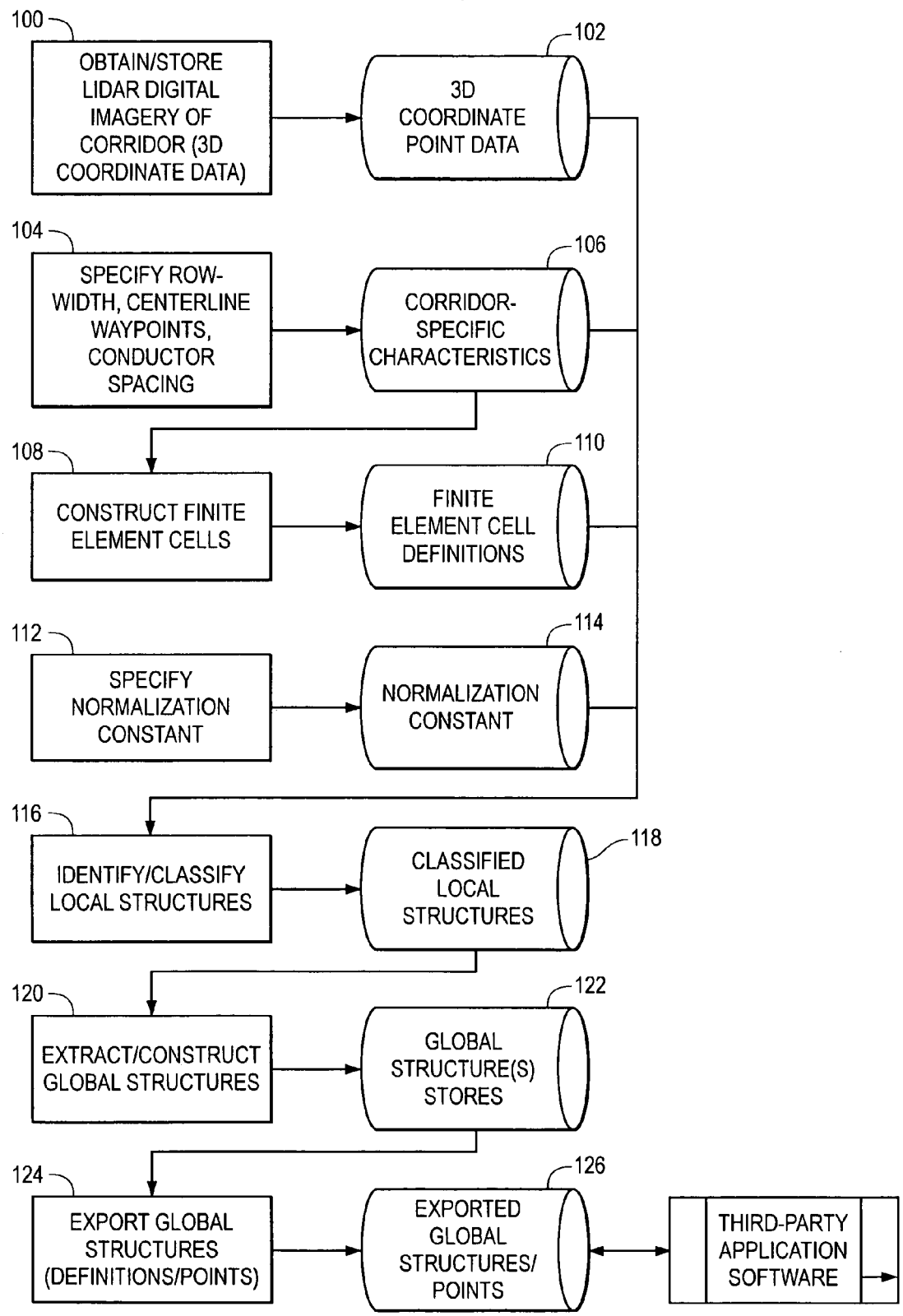
FIG. 2 is a flow diagram of the method performed by a digital filtering system which is an example of the present invention.

FIG. 2 is a flow diagram of the digital filtering process performed by the system 28 in FIG. 1. The steps in FIG. 2 need not be performed in the sequence indicated. In step 100, a digital 3-dimensional image, such as that obtained using an aerial scanning LIDAR digital image data set taken from the LIDAR instrument 14 is input in the system 28. The LIDAR digital image data acquired along a particular path/corridor may contain objects such as electric power transmission lines and supporting structures, other man-made structures, vegetation, and bare-earth topography. Some of these objects are known to be present in the image and their mathematical functions (descriptions) as will be explained below, are programmed or stored in the software system 28 and used to further process the data associated with the area 12 of FIG. 1.

The corridor of interest is defined (neglecting elevation) and is further broken into segments. Each segment is associated with two waypoints (typically turning points along the centerline of the path/corridor). It is to be understood that more waypoints may be used for greater numbers of segments or larger corridors of interest. The segment is defined as the space between the two waypoints being further bounded within a specified distance (the corridor width) from the line connecting the two waypoints (corridor centerline). The corridor of interest is the union of all such segments. An area of interest for a given segment is characterized by a set of points contained within a closed polygon bounding the segment. The area contained in this polygon defines the area of interest (e.g., length is equal to the distance between the two waypoints while width is equal to the corridor width). The boundary between any two segments lies along the bisector of the segment turning angle, while the outside boundary of the two end segments lies along a line perpendicular to the segment centerline.

For example, individual waypoints along the centerline of an electric power transmission line have been located at each turning point along the right-of-way in Cartesian (x, y) coordinates as a means of guiding the process along the path of interest. Of course other means of guiding the process such as the primary direction of traversing the scene may be identified in other digital images. The principal geometric attribute of an electric power line is a horizontal plan form of the conductor spacing. The spacing (centerline offset distance) of the electric power line has been determined to facilitate the extraction of individual conductor segments. In the case of an electrical power line, it is generally assumed that the structures supporting the electrical conductors can be expected to stand erect. In step 106, the characteristics of the defined corridor or area of interest are stored.

In step 108, the corridor or area of interest is broken into finite element cells of a specified dimension. The dimensions and orientation of the individual finite element cells are specified based on the geometrical properties of the principal physical structures intended to be extracted from the corridor or area of interest. Typically, transmission right-of-way edges and transmission conductors run in a direction parallel to the direction of the centerline of the corridor of interest. Additionally, transmission conductors typically run parallel to each other.

The finite element cells are aligned parallel to the centerline of the corridor of interest, and they are constructed to efficiently accommodate changes in direction of the corridor and other geophysical parameters. The cell length is specified as the length of the longest side of a particular area of interest (single corridor segment) divided by a convenient integer value small enough to account for changes in the terrain surface. Similarly, the cell width is determined by dividing the corridor width by a convenient integer to increase the probability that the majority of the coordinate points associated with any single particular object of interest such as a conductor will lie in a single column (vertical plane) of finite element cells. The intent is to facilitate the extraction of each individual conductor along the entire length of the corridor of interest. The vertical dimension of the cells is chosen conveniently to increase the probability that the population of vegetation points under the conductor will not dominate within a cell containing conductor points. For example, the finite element cell size for extraction of transmission structures, conductors, bare-earth, and vegetation is typically 5 feet by 5 feet by 10-to-20 feet long.

The length of the finite element cell cannot be so long as to create a bias in the extraction of local structures from the apparently random set of point coordinates. To counter this inherent bias, each dimension is normalized so that no particular direction is favored. Dividing each cell dimension by its extent, the "new" cell will be a sphere in a "normalized" coordinate system. Thus, linear objects will retain their linear character, while apparently random distributions of points (e.g., vegetation) will still appear to be random.

In the example of extracting transmission conductors (lines), the cell dimensions should be defined such that two conductors are not contained in a single cell. The cells may be either rectangular or ellipsoidal in shape; cells may overlap; and cells may be rotated in any direction to accommodate extraction of local structures.

A normalization constant, N is specified in step 112 and controls the effectiveness and efficiency of local structure extraction. The normalization constant is selected based on the roughness of the terrain, the object density and orientation, and the degree of coordinate point dispersion. Thus, more dense data and/or more irregularly shaped areas of interest will require smaller finite element cells and proportionally a smaller normalization constant, while more uniform, sparse data and/or more regularly shaped areas of interest will accommodate larger finite element cells and a proportionally larger normalization constant. The normalization constant is stored in step 114 by the system 28.

Neither the size of the finite element cells nor the magnitude of the normalization constant need to be fixed (e.g., held constant) either within specific areas of interest or across multiple areas of interest. The variability allows the system to accommodate the changing nature of the geophysical properties of the physical objects to be extracted from any particular digital imagery scene. The stored data of steps 102, 106, 110, and 114 are used by the system 28 to filter objects from the area of interest.

The system 28 identifies and classifies local structures in step 116. The spatial relationships of the digital imagery coordinate points within each finite element cell are analyzed. A 3×3 covariance matrix is calculated (where $C_{j,k}$ is the element in row j, column k in the matrix, $(x_i)_j$ is the coordinate of point i in dimension j, n is the number of points in the cell, $N_j$ is a normalization constant determined in step 112 and $m_j$ is the mean value of the coordinates of the points in dimension j):

$$C_{j,k} = \frac{1}{n \cdot N_j \cdot N_k} \cdot \sum_i [(x_i)_j - m_j] \cdot [(x_i)_k - m_k]$$

The eigenvalues and eigenvectors of the matrix are then calculated, each eigenvector $\vec{e}$ and corresponding eigenvalue $\lambda$ satisfying the equation:

$$C \cdot \vec{e} = \lambda \cdot \vec{e}$$

Where $N_k$ is a second normalization constant, $m_k$ is the mean value of the coordinates of the points in dimension k, and C is a constant.

There are three eigenvalues and three corresponding eigenvectors calculated for each cell. Each eigenvalue is a measure of the spread of the data in the direction of its corresponding eigenvector. This gives an estimate of the geometrical properties of the points in the finite element cell. In step 116, the eigenvalues and eigenvectors of each finite element cell are examined to determine the local structure(s) that is contained in the cell. From finite element cell geometry and LIDAR digital imagery point data, local structures are identified and/or classified as bare-earth/ground points, vegetation points, conductor points, conductor attachment points, and supporting structures (poles/towers) points in step 112. The determined local structures are stored in step 118.

The finite element cells may be classified into different local structures in step 116. A cell may be classified as a bare-earth/ground structure element which is characterized by two large eigenvalues. A cell may be classified as vegetation which is characterized by three large eigenvalues. A cell may also be classified as different man-made structures. For example, a cell may be classified as a supporting structure for conductors which is characterized by a single large eigenvalue, with a corresponding eigenvector that is vertical. A cell may also be classified as a conductor which is characterized by a single large eigenvalue and a corresponding eigenvector pointing in the direction essentially parallel to the line connecting the two waypoints (in the case of a corridor of interest).

A group of neighboring cells may be classified from object types determined through analysis of previously analyzed cells. In the example above, cells which contain conductors (e.g., "wires" with a single large eigenvalue) may be analyzed to determine the direction of the corresponding eigenvector. The direction of the eigenvector points in the direction of other cells that are likely to contain similar local structures (e.g., other wires). Thus the position (e.g., location in space) of finite element cells can be adjusted to accommodate the classification process (e.g., the extraction of local structures).

In step 120, globally significant structures are composed from the local structures. The global structures extracted/composed in this example include individual supporting structures such as vertical poles or towers in the area 12. Finite element cells that have been identified as containing points belonging to supporting structures (poles or towers) are located next to and/or on top of each other. From the coordinate points contained in such cells (e.g., coordinate points belonging to this particular type of common local structure) the geometry of the globally complex structure (poles or towers) can be defined.

The global structures composed in this example include individual supporting structures such as poles or towers in the area 12. Finite element cells have been identified as containing coordinate points belonging to conductor support structures and are located next to, or on top of each other. From these points (belonging to a common local structure type), the geometry of the globally complex structure may be defined. In this example, globally complex structures are extracted as individual supporting structures such as poles or towers.

Individual transmission conductor spans are defined between consecutive conductor-attachment points. In this example the globally complex structures include conductor catenary curves which are defined along neighboring consecutive conductor points (local structures) within a span. A bare-earth/ground surface is defined across the area covered by the ground points while vegetation and other points are identified and classified for subsequent display and analysis (e.g., "danger-tree analysis").

Specifically, individual transmission conductor spans between two consecutive supporting structures may be extracted. The conductor cells within each span are grouped together, by examining the direction that the conductor runs in each cell (the eigenvector associated with the largest eigenvalue of a conductor cell will point in the direction of the adjacent conductor cells in the span). The global structures are then stored in step 122.

Conductor attachment points may be extracted by identifying the conductor point that is nearest the supporting structure for each transmission conductor span. An attachment point is extracted for each of the two supporting structures associated with the conductor span.

Conductor catenary curves for each transmission conductor span may be extracted by determining the two attachment points and the point of minimum elevation in the span to provide the boundary conditions necessary to mathematically define the catenary curve of the conductor (e.g., the globally complex structure).

Vegetation such as trees, bushes and other vegetation are extracted for subsequent analysis. The terrain of the area of interest is determined by removing all extraneous data such as vegetation, supporting structures, conductors, etc. Man-made structures are extracted by finding finite element cells that contain points that either belong to flat surfaces or show a sharp break in elevation with the surrounding ground surface.

The globally complex structure data is the prepared for export from the system 28 in step 124 by processing the data into a format which may be accessed by some specific third party software. In the example of locating electric power transmission lines, the data may be translated into data formats for engineering modeling software packages such as PLS-CAD, TL-CAD or Pole-CAD. The translated data is stored in step 126 and thus made available for third party software. This data may then be used by the third party software for any number of different purposes such as mining surveys, construction surveys, rating the capacity of transmission lines, road surveys and railroad surveys.

The system 28 is an example of an automated system which rapidly, accurately, and efficiently processes aerial three-dimensional digital imagery of topographic scenes to extract both natural and man-made objects. The area of interest may be modeled as either a regularly and/or irregularly shaped (e.g., geographically bounded) path/corridor or larger area. The boundary of the path/corridor or area of interest can be uniquely defined to eliminate the need to process extraneous data points not contained in the area of interest of the original digital imagery. The primary geometrical and/or physical attributes of the objects extracted from the image may or may not be used to control or bound the analysis/extraction process (e.g., vegetation, noise, etc.). All of the processing of the system 28 is performed via a single mathematical procedure, without the need for human interpretation or intervention. It is to be understood that either or both the simpler local structures (e.g., identified and/or classified data points) and the more globally complex (extracted) structures can be passed as input to readily available commercial computer software packages for further processing. Furthermore, the system 28 can be extended to rapidly, accurately, and efficiently process n-dimensional digital imagery for the purposes of extracting both natural and man-made objects. An example of 4-dimensional data would be the addition of the LIDAR sensor return signal "strength" (e.g., the fourth dimension) to typical three-dimensional coordinate point (x, y, z) data. These coordinate points may be tied to any of several coordinate frames of reference. The individual n-dimensional coordinate data points may be acquired or captured in either an ordered or an apparently random sequence (e.g., time-, distance-, spatial-, or event-driven sequence).

Figure 3:
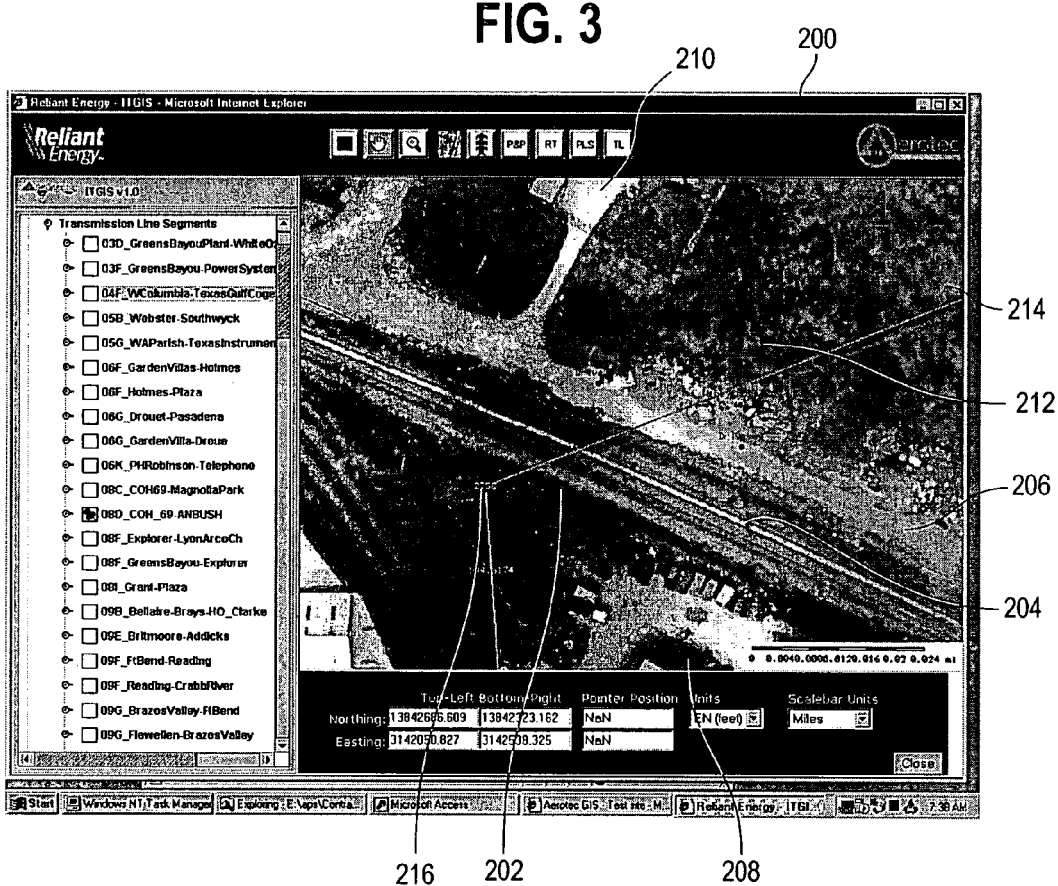
FIG. 3 is a digital image of an area of interest having different features which are to be analyzed by the method in FIG. 2.

The application of the system and method described in FIG. 2 may be illustrated in the images in FIGS. 3–8. FIG. 3 depicts a rasterized LIDAR digital image 200 for a corridor of interest which is scanned by the LIDAR instrument 14 in FIG. 1. The area of interest 200 contains a number of natural and man made structures including a variety of topographical features such as a fence 202, a railroad 204, a driveway 206 and a building 208. Natural features include bare earth 210 and trees 212. A centerline of an electric power transmission line 214 traverses this varied terrain and is suspended by transmission towers 216. FIG. 3 illustrates the difficulty in extracting local and global structures from the data set absent the system of the present invention since all the topographical features have been digitized into a large volume of individual 3D point coordinates. Typically, the data may only be visualized on a two-dimensional computer display screen, and a single view is insufficient for extracting objects from the data. Very dense overlapping point data and loss of information in the two-dimensional views make it impossible to accurately identify and isolate the global structures (i.e. the geometric objects).

Figure 4:
FIG. 4 is a very dense 3D LIDAR digital imagery point coordinate data set (Cartesian coordinate system) for a path/corridor to be analyzed by the system according to one example of the present invention.

FIG. 4 shows apparently random data point coordinates, describing a topographic scene involving an electric power transmission line right-of-way, as captured using LIDAR technology. Basically, each object within the "view" of the LIDAR instrument is digitized (e.g., at least one LIDAR pulse impinges on each object). When the data is projected in an isometric view, the viewer's mind interprets the data and forms (identifies) recognizable objects from combinations of neighboring LIDAR point coordinates (e.g., the viewer breaks the scene down into recognizable objects [a classification process]). If the viewer were to attempt to manipulate the classified objects in some way, the viewer would need to extract the coordinate points associated with a particular classified object and further describe/define the object somehow. Basically, the LIDAR coordinate data is practically useless unless objects in the scene can be a) identified or classified and b) extracted and defined in a useful manner. The LIDAR "scene" of FIG. 4 contains bare earth, electrical conductor, conductor support, vegetation, and other man-made objects.

Figure 5:
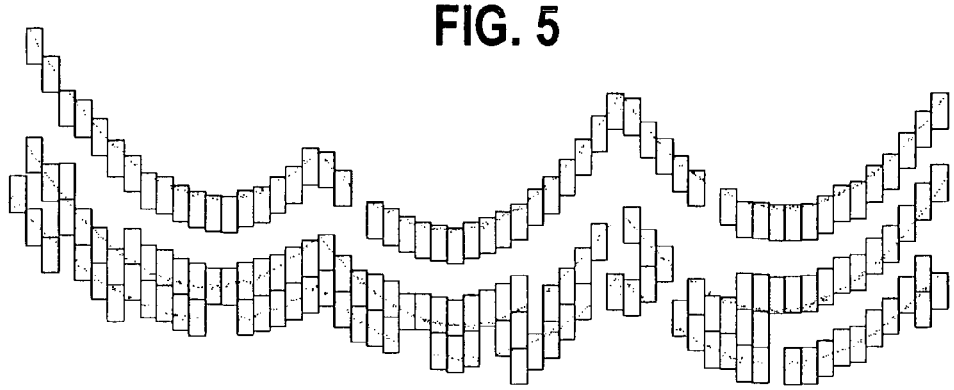
FIG. 5 is a chart showing three dimensional finite element cells, within the field of the digital imagery point coordinate data of FIG. 4.

The system 28 described thus provides isolation of different objects to overcome the obscuring from the different viewing perspectives. FIG. 5 depicts a front-side view of three dimensional finite element cells that were used in the extraction of electrical conductors in the digital imagery coordinate data set of FIG. 4 as performed in step 108 of FIG. 3. In this view, the cells are rectangular in shape and do not overlap, and conductors are the only local structures displayed. The individual digital imagery point coordinate (conductor) data is also shown.

Figure 6A:
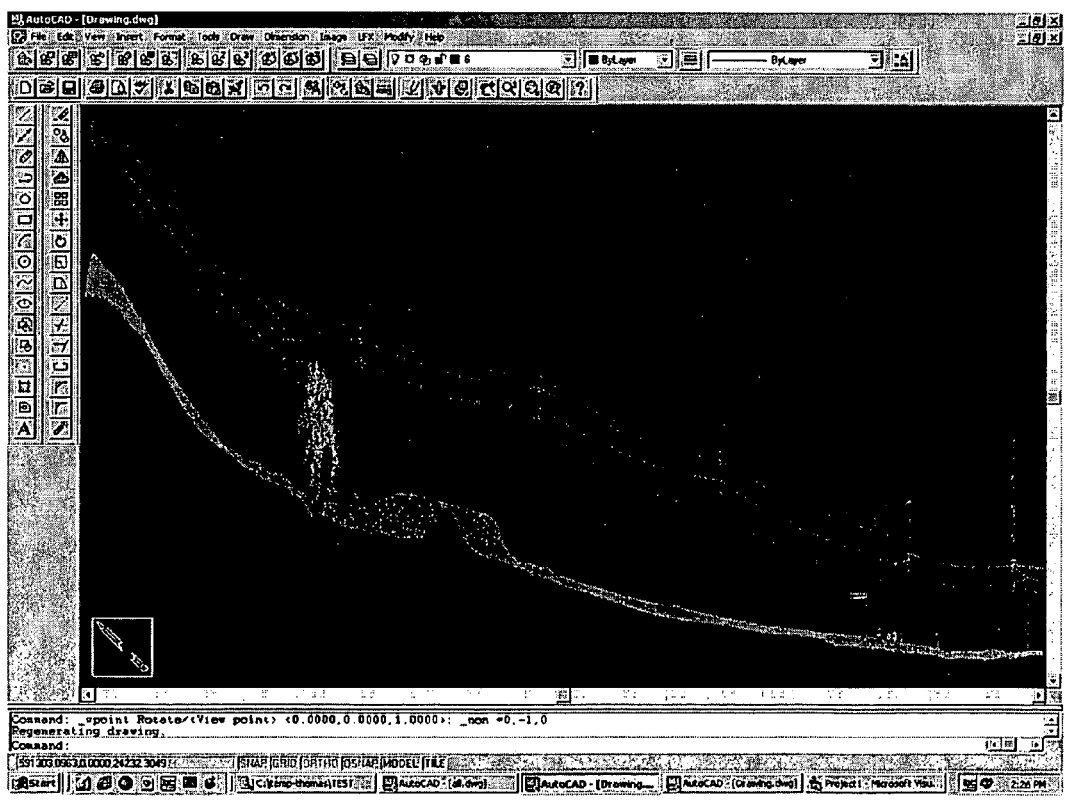
FIGS. 6A and 6B illustrate vegetation, ground, poles and electrical conductor data points as extracted from the original digital image point coordinate set of FIG. 4 by the process according to the present invention.
Figure 6B:
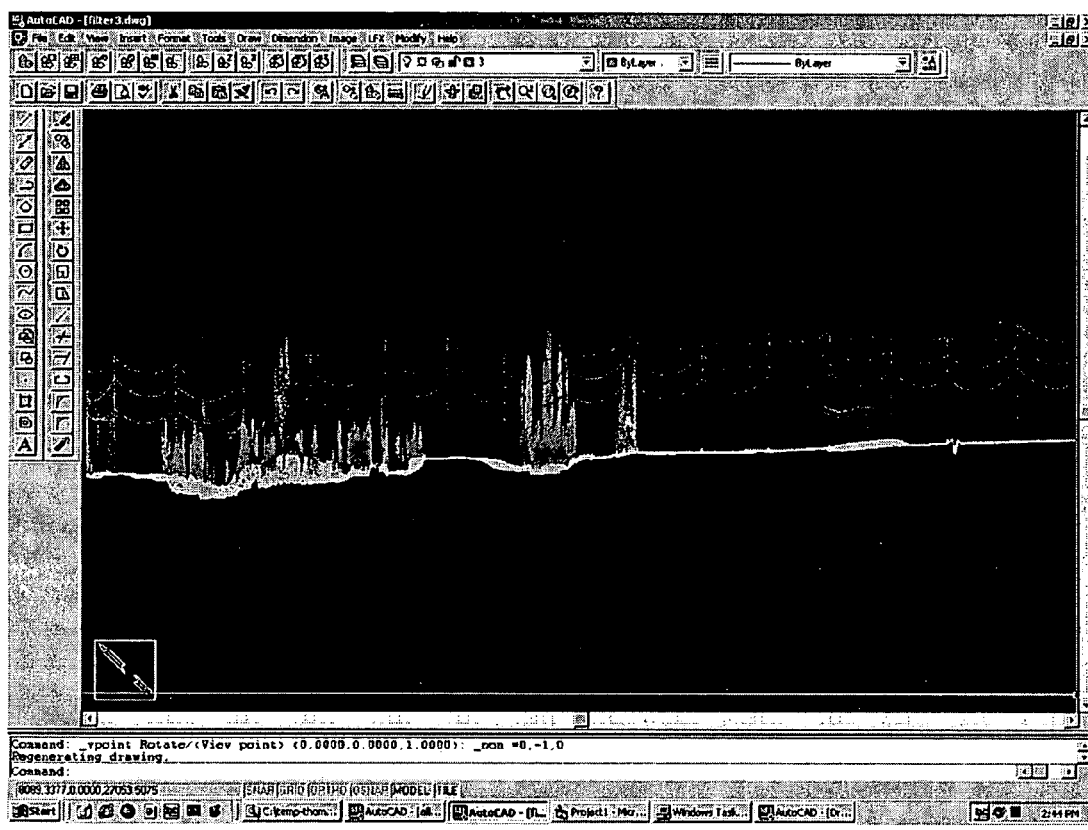

FIGS. 6A and 6B depict (in isometric projections) different types of identified/classified local structures (objects) shown together in a LIDAR digital image along a path/corridor. FIGS. 6A and 6B show the resulting identification of local objects performed in step 116 in FIG. 3 prior to the extraction of global structures. The principal types of local structures depicted in FIGS. 6A and 6B include "bare-earth", conductor, vegetation, and man-made structures.

Figure 7:
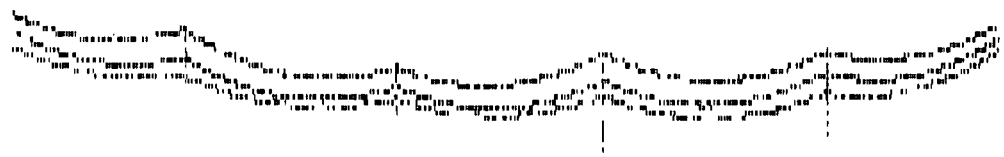
FIG. 7 illustrates digital images of man-made structures such as transmission structures and transmission conductors as extracted from the original digital image point coordinate set of FIG. 4 according to the system of the present invention.

FIG. 7 is a front-side view of the electrical conductors and supporting structures (poles or towers) extracted from the digital imagery coordinate data set of FIG. 3 derived according to step 116 of FIG. 2. Conductors are represented by the data "dots" that appear to be associated with a curved line, and supporting structures (towers) are represented by the data "dots" that appear to be associated with straight vertical lines. These local (classified) structures are used to extract global structures which are mathematically defined geometrical shapes from the data.

Figure 8A:
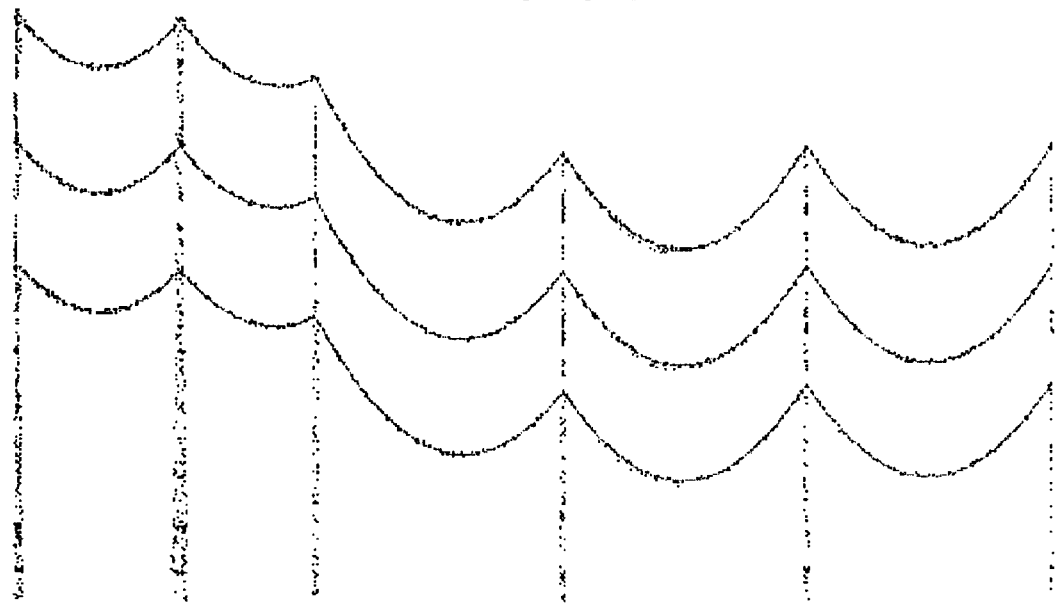
FIGS. 8A & B illustrate an example of globally complex structures (transmission conductor catenary curve geometry characteristics) as extracted from the previously extracted transmission conductor data points of FIG. 7.

FIG. 8A is a view of the transmission conductor catenary curve geometry characteristics (e.g., the globally complex structure) as extracted (determined) from the previously extracted transmission conductor data points (e.g., the local structure) of FIG. 7 in accordance with step 120 of FIG. 2. The transmission supporting structure (tower) geometry (e.g., the globally complex structure) as extracted (determined) from the previously classified transmission structure point data (e.g., the local structure) of FIG. 7.

Figure 8B:
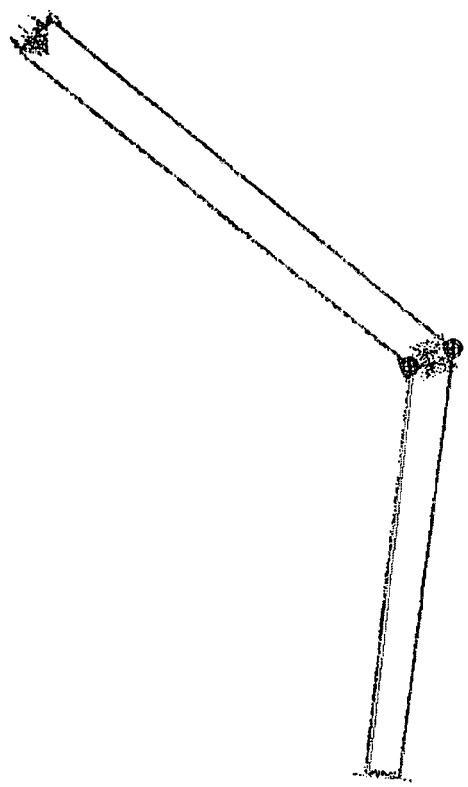

FIG. 8B shows the 3D conductor attachment point (e.g., the point at which the conductor catenary curve attaches to the transmission structure or tower) locations (e.g., the globally complex structure) as extracted (determined) from the previously classified transmission conductor and transmission structure/tower data points (e.g., the local structure) of FIG. 7 according to step 120 of FIG. 2.

Figure 9:
FIG. 9 illustrates another example of globally complex structures in the form of bare-earth contours as extracted from the original digital image point coordinate set of FIG. 4.

FIG. 9 depicts the bare-earth/ground global structure surface that was extracted from the digital imagery coordinate data set of FIG. 3 by the system 28 after step 120 in FIG. 2. The surface is shown in the form of a contour map, representing the changes in elevation. Alternatively, the surface (globally complex structure) could be depicted in the form of a digital elevation model (DEM) or a triangulated irregular network (TIN) digital terrain model (DTM).

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A method for processing digital image data taken from a three-dimensional topographic scene including terrain to extract discrete objects, the method comprising:

locating waypoints to define a centerline and a bounded area to be analyzed;

defining the primary dimensional characteristics or attributes of the objects to be extracted from the image;

defining finite element cells having a width dependent on the area of interest, a length dependent on the dimension of the objects and terrain variation and a height dependent on the discrete objects;

mapping the finite element cells to a normalized coordinate base;

grouping the digital image data, in the form of scanned three-dimensional point (x, y, z) coordinate points in Cartesian coordinate reference frames, into the finite element cells by determining eigenvalues and eigenvectors associated with each cell;

classifying each of the three-dimensional points as simple local structures;

composing globally complex structures from the local structures; and wherein spatial relationships of the three-dimensional coordinate points within each finite element cell are analyzed by calculating a 3×3 covariance matrix where $C_{j,k}$ is the element in row j, column k in the matrix, $(x_i)_j$ is the coordinate of point i in dimension j, n is the number of points in the cell, $N_j$ is a normalization constant, $N_k$ is a second normalization constant, $m_k$ is the mean value of the coordinates of the points in dimension k, and $m_j$ is the mean value of the coordinates of the points in dimension j, such that:

$$C_{j,k} = \frac{1}{n \cdot N_j \cdot N_k} \cdot \sum_i [(x_i)_j - m_j] \cdot [(x_i)_k - m_k]$$

calculating the eigenvalues and eigenvectors of the matrix, each eigenvector $\vec{e}$ and corresponding eigenvalue $\lambda$ satisfying the equation:

$$C \cdot \vec{e} = \lambda \cdot \vec{e}$$

wherein C is a constant, and such that the three eigenvalues measure the spread of the data in the direction of the corresponding eigenvectors.

2. The method of claim 1 wherein the finite element cells are spherical.

3. The method of claim 1 wherein the finite element cells are rectilinear.

4. The method of claim 1 wherein the finite element cells are ellipsoidal.

5. The method of claim 1 wherein the three-dimensional coordinate data points are captured in an ordered sequence.

6. The method of claim 1 wherein the three-dimensional coordinate data points are captured in a random sequence.

7. The method of claim 1 wherein the objects include a natural object.

8. The method of claim 7 wherein the natural object is further classified as vegetation or ground.

9. The method of claim 1 wherein the objects include a man made object.

10. The method of claim 1 wherein a cell is classified as a bare-earth/ground element if it is characterized by two large eigenvalues.

11. The method of claim 1 wherein a cell is classified as vegetation if it is characterized by three large eigenvalues.

12. The method of claim 1 wherein the cell is classified as a man made structure if it is characterized by a single large eigenvalue.

13. The method of claim 1 wherein further finite element cells are selected based on the presence or absence of objects within existing previously defined cells.

14. A system for processing a three-dimensional digital image of topographic scenes to extract discrete objects, the system comprising:

a processor which accepts inputs of a three-dimensional digital image;

wherein the processor locates waypoints to define the primary dimensional characteristics or attributes of the objects to be extracted from the image;

wherein the processor defines finite element cells having a width dependent on the area of interest, a length dependent on the dimensions of the discrete objects and terrain variation and a height dependent on the discrete objects;

wherein the processor groups the digital image data, in the form of scanned three-dimensional point (x, y, z) coordinates in Cartesian coordinate reference frames, into the finite element cells;

the processor classifies each of the three-dimensional points as simple local structures;

wherein the processor composes globally complex structures from the local structures and wherein the spatial relationships of the three-dimensional coordinate points within each finite element cell are analyzed by calculating a 3×3 covariance matrix, where $C_{j,k}$ is the element in row j, column k in the matrix, $(x_i)_j$ is the coordinate of point i in dimension j, n is the number of points in the cell, $N_j$ is a normalization constant, $N_k$ is a second normalization constant, $m_k$ is the mean value of the coordinates of the points in dimension k, and $m_j$ is the mean value of the coordinates of the points in dimension j, such that:

$$C_{j,k} = \frac{1}{n \cdot N_j \cdot N_k} \cdot \sum_i [(x_i)_j - m_j] \cdot [(x_i)_k - m_k]$$

calculating the eigenvalues and eigenvectors of the matrix, each eigenvector $\vec{e}$ and corresponding eigenvalue $\lambda$ satisfying the equation:

$$C \cdot \vec{e} = \lambda \cdot \vec{e}$$

wherein C is a constant, and such that the three eigenvalues measure the spread of the data in the direction of the corresponding eigenvectors.

15. The system of claim 14 further comprising a remote sensor capable of scanning an area and producing a digital 3-dimensional representation.

16. The system of claim 15 wherein the remote sensor is a Light Imaging Distance And Ranging instrument.

17. The system of claim 15 wherein the remote sensor is a synthetic aperture radar.

18. The system of claim 14 wherein the finite element cells are spherical.

19. The system of claim 14 wherein the finite element cells are rectilinear.

20. The system of claim 14 wherein the finite element cells are ellipsoidal.

21. The system of claim 14 wherein the three-dimensional coordinate data points are captured in an ordered sequence.

22. The system of claim 14 wherein the three-dimensional coordinate data points are captured in a random sequence.

23. The system of claim 14 wherein the object is classified as a natural object or a man made object.

24. The system of claim 23 wherein the natural object is further classified as ground or vegetation.

25. The system of claim 14 wherein a cell is classified as a bare-earth/ground element if it is characterized by two large eigenvalues.

26. The system of claim 14 wherein a cell is classified as vegetation if it is characterized by three large eigenvalues.

27. The system of claim 14 wherein the cell is classified as a man made structure if it is characterized by a single large eigenvalue.

* * * * *